United States Patent [19]
Tseng

[11] Patent Number: 5,563,491
[45] Date of Patent: Oct. 8, 1996

[54] COMBINED PARKING METER AND ELECTRIC-VEHICLE BATTERY CHARGER WITH REMOTE STATUS RECEIVER

[76] Inventor: Ling-yuan Tseng, 13772 Calle Tacuba, Saratoga, Calif. 95070

[21] Appl. No.: 148,756

[22] Filed: Nov. 5, 1993

Related U.S. Application Data

[63] Continuation-in-part of Ser. No. 904,952, Jun. 26, 1992, Pat. No. 5,297,664, which is a continuation-in-part of Ser. No. 859,985, Mar. 30, 1992.

[51] Int. Cl.$^6$ ..................................... H01M 10/46
[52] U.S. Cl. ................................. 320/2; 194/904
[58] Field of Search ..................... 320/2, 48, 30; 340/932.2, 309.3, 825.72, 825.69, 825.17, 825.44, 825.06, 825.15, 870.03; 235/381, 382; 194/216, 904

[56] References Cited

U.S. PATENT DOCUMENTS

| | | | |
|---|---|---|---|
| 4,052,655 | 10/1977 | Vizza | 320/2 |
| 4,184,580 | 1/1980 | Ellis, Jr. | 320/2 X |
| 4,383,210 | 5/1983 | Wilkinson | 320/2 |
| 4,496,896 | 1/1985 | Melocik et al. | 320/2 |
| 4,532,418 | 7/1985 | Meese et al. | 320/2 X |
| 5,029,094 | 7/1991 | Wong | 340/932.2 |
| 5,266,947 | 11/1993 | Fujiwara et al. | 340/932.2 |
| 5,297,664 | 3/1994 | Tseng et al. | 194/217 |
| 5,311,973 | 5/1994 | Tseng et al. | 320/2 X |
| 5,327,066 | 7/1994 | Smith | 320/2 |
| 5,351,187 | 9/1994 | Hassett | 340/928 X |

*Primary Examiner*—Peter S. Wong
*Assistant Examiner*—Edward Tso
*Attorney, Agent, or Firm*—Gifford, Krass, Groh, Sprinkle, Patmore, Anderson & Citkowski

[57] ABSTRACT

A combined parking meter/battery charger station includes a detachable remote receiver to inform the vehicle operator of charge-level status and other information. Upon sufficient payment or credit, the remote receiver is released so that it may be carried away from the charging station. The receiver includes a visual or audible indicator which may keep the operator apprised of charge status, time remaining on the meter or account information. The audible alert may be used to indicate a full charge or to warn that little time is remaining, or other conditions. Communication from the station to the receiver may either be directly from the station or, alternatively, a station may communicate with a central office associated with a plurality of the stations and broadcast may be made therefrom.

7 Claims, 2 Drawing Sheets

COMBINED PARKING METER AND ELECTRIC-VEHICLE BATTERY CHARGER WITH REMOTE STATUS RECEIVER

RELATED APPLICATION

This is a continuation-in-part application of U.S. patent application Ser. No 07/904,952 filed Jun. 26, 1992 which issued as U.S. Pat. No. 5,297,664 on Mar. 29, 1994 and which is a continuation-in-part of copending U.S. patent application Ser. No. 07/859,985, filed Mar. 30, 1992.

FIELD OF THE INVENTION

The present invention relates generally to electric vehicle charging and, in particular, to a combined parking meter and charging station including a remote communicator to inform the vehicle operator of charge-level status and other information.

BACKGROUND OF THE INVENTION

Due to the depletion of petroleum resources and concern about pollution, there has been increased pressure on motor vehicle manufacturers and users to provide cars which run on cleaner alternative energy sources such as electricity. Despite continuing research, however, the typical range of an electric car is presently no more than about 60 miles. This distance may be sufficient for certain commuters, however, even if the range is improved, there will remain a need to provide for recharging the vehicle remotely from the place where it is garaged.

Unlike gasoline-powered automobiles, for which numerous service stations are now conveniently located, such an infastructure would be difficult and time-consuming to install for electric vehicles, especially as such vehicles are phased in and, consequently, small in number. Moreover, although electricity is a commonly available resource, the recharging of an electric car's battery will take a relatively long time as compared to the time required to fill the tank of a gasoline-powered car. Thus, an electric service station might require a large number of charging areas, and each customer may have to wait an inordinately long time at a place where they do not wish to spend time.

There have been proposals to simply swap an old battery for a new one at such stations, however, this presents problems of its own, including the fact that the recipient of the new battery cannot be guaranteed of the quality of the exchanged unit, which may lead to operating problems and liability issues. Even if charging stations are located in convenient places, such as in shopping or working areas, the operator may wish to know the status of the charging process in order to allocate time accordingly.

SUMMARY OF THE INVENTION

The present invention improves the convenience of electric vehicle recharging in at least two ways. Firstly, a parking meter and charging station are combined in a single stand, thereby enabling an operator to park at a desired location and charge the vehicle's battery at the same time. Secondly, the combined meter/charger unit provides a pocket-sized communication device which may be carried by the operator to be apprised of the status of the charging process at a remote location, so that time is not wasted wondering when the vehicle will be charged to a desired level.

Power lines, preferably located underground, feed each station from a source dedicated to a number of stations in a particular area. Each unit will accept payment in the form of coins, tokens, or be equipped with a credit-card reader. With sufficient payment or credit, the power cord may be released for attachment to the vehicle and the remote receiver becomes detachable so that it may be carried away from the charging station. Alternatively, if a wireless charging system is utilized, such as one based upon magnetic induction or microwave energy transfer, such a system will likewise become activated upon payment/credit authorization. As the station begins charging the vehicle, the system accounts for time and debits the customer's account accordingly. The charging status is also monitored at the charging station, either by detecting a status signal from the vehicle or, alternatively, by monitoring charging current in order to calculate an independent determination of charging status apart from a separate signal received from the vehicle.

The remote receiver includes a visual indicator which shows at least a rough approximation of charge status, for example, with a plurality of light emitting diodes which indicate low, medium and high charge levels. More sophisticated versions of the receiver indicate charging status with a higher resolution, and/or with an audible alert which indicates a full charge or low time remaining.

The information relayed to a receiver is derived from at least two sources. Firstly, each charging station may itself be equipped with a radio transmitter which communicates with the detached receiver. Alternatively, to save on construction costs or to increase range, signal lines may be included underground along with the power lines, thereby enabling a large number of stations to communicate status and account information to a more centralized source responsible for broadcasting to a large number of receivers. Frequency allocation is easily accommodated since the amount of information transmitted to a particular communicator is minimal. Specifically, if a short burst of information is communicated to a particular receiver even every few minutes, it is sufficient for the purposes of updating, thus allowing a single channel to be used for a vast number of remote receivers.

DETAILED DESCRIPTION OF THE PREFERRED EMBODIMENTS

The present invention enables the battery of an electric vehicle to be recharged at a convenient location by combining a parking meter with a battery charging station. Hereinafter, the term "station" will be used to mean this combined parking meter/charging station. Additionally, so that the vehicle operator may be apprised of charging status, even when visiting a location remote to the station, the present invention further includes a hand-held receiver device which may be carried by the operator, and which includes some type of visual or audible indicator relating to charging status and/or time remaining on the parking meter. For the purposes of the discussion which follows, the term "remote receiver" will be understood to mean this hand-held device, regardless of the type of indicator utilized.

Figure 1:
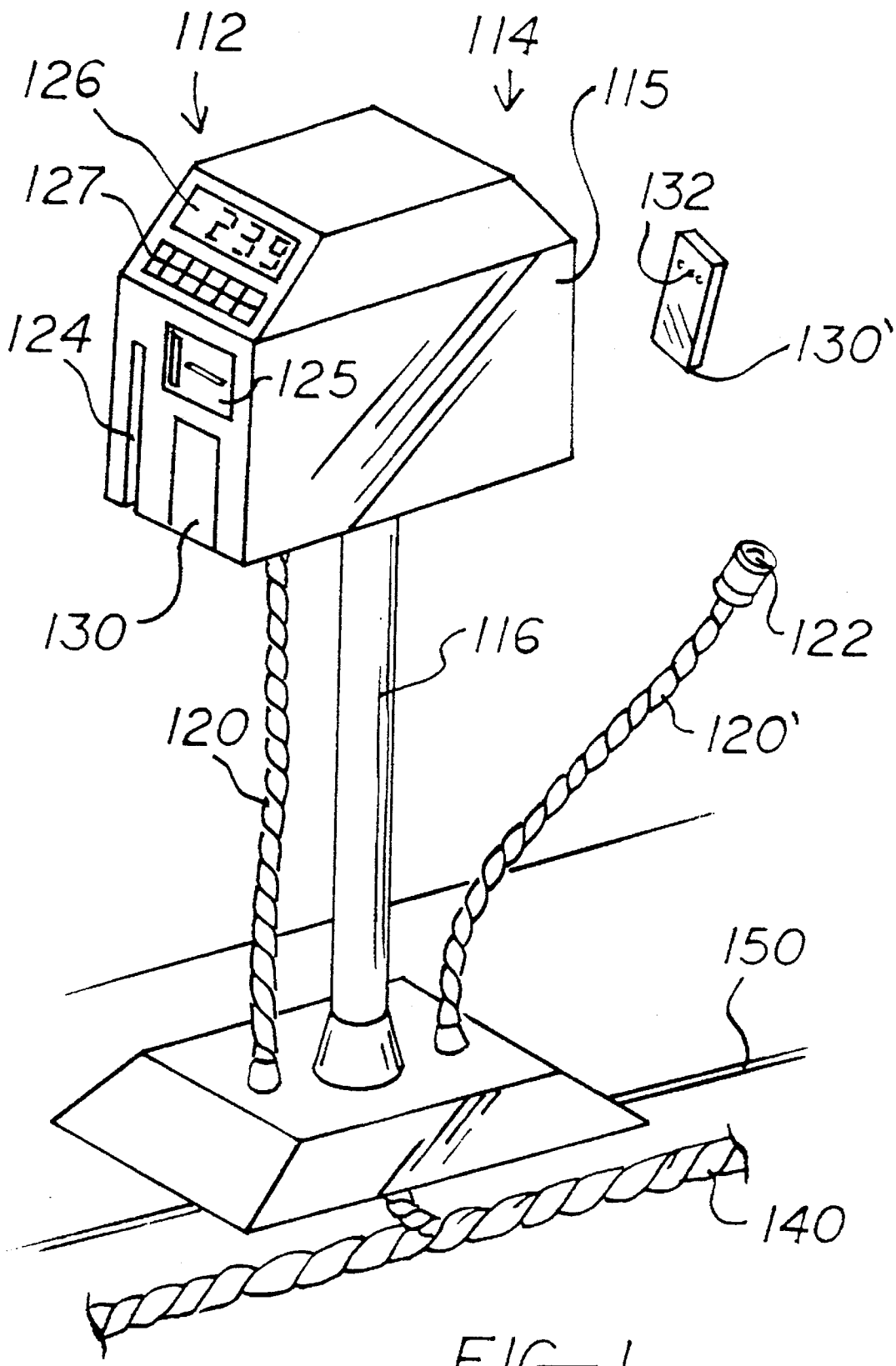
FIG. 1 is an oblique drawing of a single meter/charging station capable of servicing two vehicles.

Making reference now to FIG. 1, there is shown in this drawing an oblique representation of a single station 110 constructed in accordance with the present invention, this particular design including two halves 112 and 114, each capable of servicing a separate battery-powered vehicle. This embodiment makes efficient use of the various components within the station, although stations capable of servicing one or more than two vehicles are also possible, depending upon the area in which the stations are placed.

The station includes a stand with an upper head portion 115 supported on a base 118 by a generally upright member 116. Each side includes a power cable 120 or 120' which becomes detached, in turn allowing connector 122 to become available for connection to an electric vehicle upon payment or credit received. Cables 120 and 120' are preferably contained within a flexible metal sheath to protect against damage and vandalism. As mentioned, alternative charging systems are also possible, such as inductive and microwave-based.

In order to activate the station, coins are either inserted into unit 125 or a credit card is passed through slot 124. Unit 125 may also accept bills or give change, depending upon the desired sophistication of the unit. Once payment or credit verification is received, display 126 will show either the amount entered or the fact that the credit card has been approved. This approval process can either be done via wireles's communication between the station and some remote location or, alternatively, via wires 150 located beneath the ground in direct communication with some form of central office. Since the payment required to both park in an area and charge a vehicle will no doubt result in a relatively substantial expense, the use of a credit card is preferred, though a bill changer accepting large denominations may also be convenient. The system will additional accept coins, however, in the event that a non-electric car or a vehicle not requiring a charge wishes to use the station as a simple parking meter.

Once payment or credit is received, the operator may use keypad 127 to enter desired functions such as the upper limit of money to be spent, the desired amount of time to remain at the station, plus options such as fast-charge mode, plus the use of the remote receiver itself, the use of which will preferably require a surcharge to ensure that the device is not lost or stolen. In addition to the entry of typical monetary amounts and time values, for example $5 and one hour, due to the fact that the present invention accepts credits cards, IC cards, and the like, another aspect of the invention is the ability of a customer to choose flexible parking times and/or amounts to spend, depending upon the situation. For example, if the customer knows that he or she only has $4.50 to spend on time and/or charging, an option may be selected relating to parking time and charge level based upon that amount. Alternatively, if the customer only has 11 minutes but wishes a maximum charge, that time may be input with the selection of a fast-charge mode, and a display device on the station and/or remote receiver will let the customer know, in advance, what charge level will be attained for that amount of time.

Upon release of cable 120', the operator may plug connector 122 into the vehicle, take the detached receiver 130' from the station and leave the scene. While away, either an audible or visual indicator on the receiver 130 will inform the carrier as to the level of charge so that the person's time away may be adjusted to match the amount of time required for the desired charge level. The remote receiver may also include other information, such as the amount of time remaining or the amount of money spent so that the operator may adjust the time away from the station accordingly.

Signals are received by the remote receiver via radio frequency either transmitted by the station with which the receiver is associated or from a more centralized office and broadcast facility in wireless or wired communication with a plurality of the stations. Power cables 140 are routed underground and feed electrical energy to each station from a common source. During installation of these cables, it may be convenient to run signal wires 150 as well to this common source, thereby allowing a billing or transmitting facility to be located at the point where the power is distributed. Alternatively, conductors 150 may represent a standard telephone line being routed to each station, each station in such a case further including a telephone dialer which may be used to place various calls including those associated with credit verification, broadcasting, or other communication needs associated with the operation of a particular station.

Figure 2:
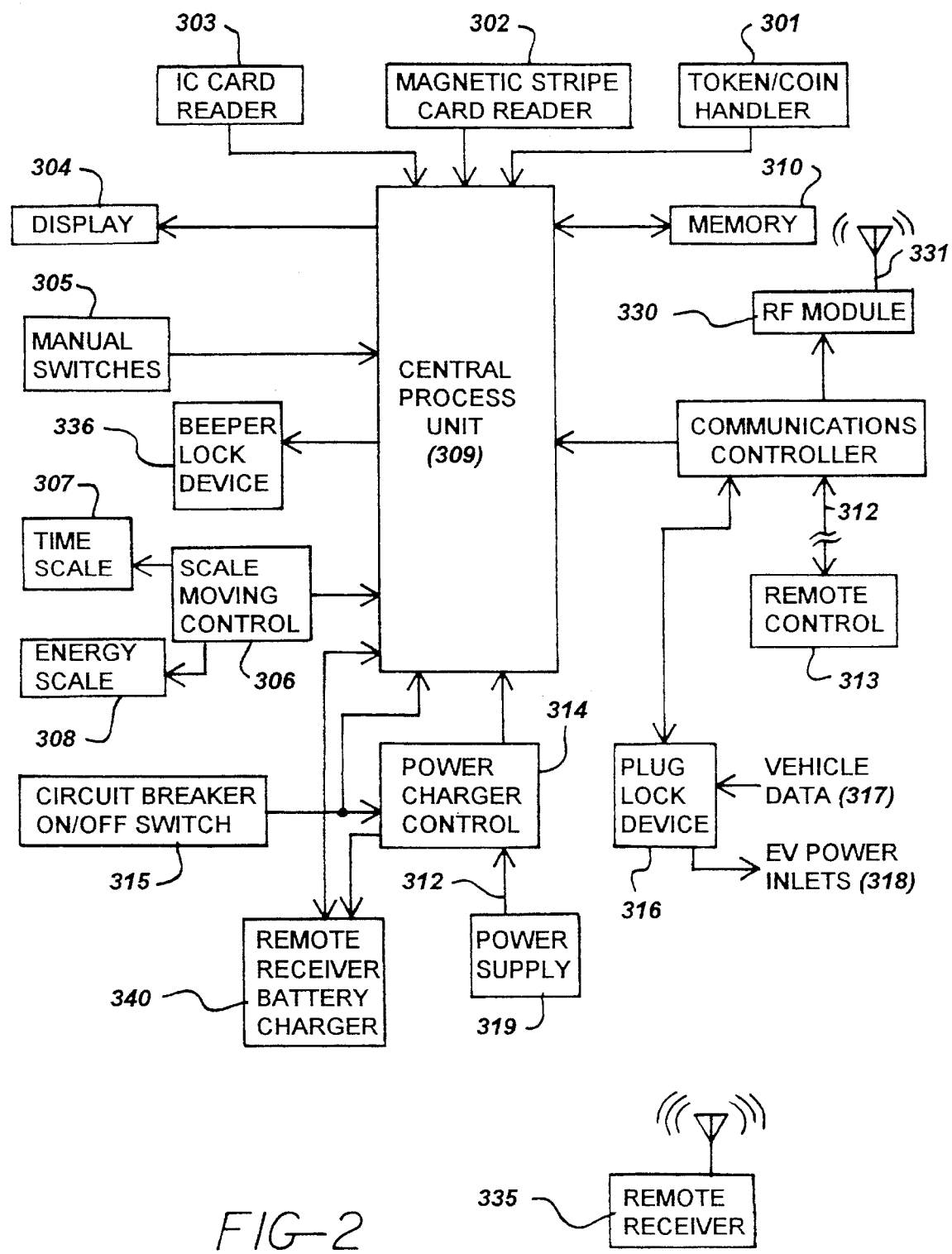
FIG. 2 is a block diagram used to show the various subsystems within a station dedicated to a single vehicle.

Now making reference to FIG. 2, there is shown a block diagram of electrical and mechanical components which make up a station capable of servicing a single vehicle. As mentioned, each station may alternatively be configured to service two or more vehicles, in which case certain of the blocks depicted in FIG. 2 would be duplicated or shared, depending upon resource requirements. Additionally, although FIG. 2 depicts the addition of an RF transmitter 330 as part of the station. As mentioned, if the station communicates by wire to a remote office, RF communication may be between this remote office and the remote receiver, thereby obviating the need for a separate RF transmitter in each station. A central processing unit 309, preferably including a microcomputer of conventional design, controls the overall functioning of the station. Desired options may be entered by an operator through a manual keypad 305 disposed on the head unit 115 of the station shown in FIG. 1. Inputs from coin/token handler 301, magnetic stripe card reader 302, and IC card reader 303 also feed central processing unit 309, providing information as to the amount of money accepted, credit card number or other data concerning the operator's account, loading such information into memory 310 for subsequent use. The amount received, the amount of time remaining, and other information convenient to station use is output by central processing unit 309 to display 304.

A communication controller 311 interfaces to central processing unit 309, this controller being responsible for communications with the remote receiver and, if so equipped, with a central office. If the station is equipped with its own RF transmitter, charging status updates are delivered by communication controller 311 to RF module 330 and broadcast out of antenna 311. Since the range of the station need not be large, antenna 331 may be disposed along the upright member 116 depicted in FIG. 1 without being observable external to the station.

Information received from a remote central office comes in through remote controller 313 along line 312 and into communication controller 311. In the event that a particular user is not authorized to operate the station communication controller 311 may send signals to a plug/lock device 316 to stop power from the remote supply 319 and supplied along cables 312 from being delivered to the vehicle. The plug/lock device is used to interface the charging cable to the car using interface 318. As an option, vehicle information 317 may also be received by the plug/lock device along separate lines, this vehicle data including charging status, or even a vehicle identification number in the event that certain vehicles are banned from using the system. A circuit breaker and on/off switch 315 is provided and under the control of central processing unit 309 to interrupt power in the event of a problem, be it lack of funds, damage, etc. A battery charger 340 may be included to recharge batteries in the remote receiver.

The remote receiver 335, as mentioned, may include any type of audible or visual indicator of charge level status or other information such as time remaining or funds remaining or available. Of course, the device may further include information not related to the charging process, such as time of day. In a basic configuration, the remote receiver will include only a few light-emitting devices to indicate, for instance, low, medium or high charge levels. Other possible options include a beeper which sounds when the vehicle is substantially charged, thereby enabling the carrier to go about business without constantly referring to a display device on the remote receiver. Additionally, the display may be more sophisticated, and include a numerical readout of charge level or time remaining at a higher resolution. In the event that the remote receiver is not to be removed from the station, a lock device 336 under the control of central processing unit 309, may be used to ensure that the device is not released, in which case, display 304 may report this or other conditions to the operator.

I claim:

1. In a combination parking meter and electric charging station for battery-powered vehicles, the improvement comprising:

a radio transmitter associated with the parking meter/charging station for broadcasting status information; and a portable radio receiver adapted to receive a broadcast from the transmitter, which a user of a vehicle parked at the parking meter/charging station may carry to a remote location and be appraised of the status information, the status information including:
 a) current charge level of the vehicle's battery,
 b) time remaining on the parking meter and
 c) expenses incurred on the parking meter/charging station, including time and energy consumption, and wherein:

the receiver includes an identifying code used by the transmitter to ensure reception of status information concerning only the parking meter/charging station with which that particular receiver is associated, and the status information is communicated by the parking/meter charging station to the radio transmitter via a hardwired connection for subseauent broadcast.

2. A combined parking meter/battery charging station for electric vehicles, comprising:

a stand, including a base, an upright member attached to the base, and a head unit mounted on the upright member;

means to route power to the stand;

means supported on the head unit to accept a payment;

an operator interface supported on the head unit to receive commands;

a remote radio receiver, detachable from the head unit, to receive broadcast status information relating to the electric vehicle;

means to deliver power from the stand to an electric vehicle parked at the stand in order to recharge a battery disposed within the electric vehicle;

power-control means disposed in the power path;

a transmitter operative to transmit the status information to the remote radio receiver;

electronics in operative communication with the operator interface, the means supported on the head unit to accept a payment, the power-control means and the transmitter, whereby an operator may enter options relating to parking time, charging level, and funds, the electronics causing the transmitter to broadcast the status information to the remote radio receiver, wherein the transmitter is disposed at a location remote from the stand, the stand is connected to a standard telephone line, and the stand communicates status information to the transmitter for subsequent broadcast by way of the telephone line.

3. The combined parking meter/battery charging station of claim 2, wherein the means to deliver power from the stand is a non-contact type of charging system.

4. The combined parking meter/battery charging station of claim 2, wherein duplicate facilities are supported on the head unit and duplicate power delivery and control means are provided by the combined parking meter/battery charging station so that one stand can accommodate two vehicles parked at the stand.

5. The combined parking meter/battery charging station of claim 2, wherein the remote receiver includes rechargeable batteries and the station further comprises a recharger for the batteries in the remote receiver when the remote receiver is not detached from the head unit.

6. A system for recharging electric vehicles, comprising:

a power-distribution facility;

a plurality of combined parking meter/battery charging stations, each configured to receive power from the power-distribution facility, each station including features to accommodate two vehicles parked at the station, the features including:

two detachable remote radio receivers, one for each vehicle;

a transmitter operative to transmit status information to at least both the remote radio receivers;

a common power-control unit in an electrical power path with the power distribution facility operative to route power to either of the vehicles on an independent basis;

payment acceptance means shareable by users of either vehicle;

an operator interface, including a keypad and a display, shareable by users of either vehicle;

electronics in operative communication with the operator interface, the payment acceptance means, the power-control unit and the transmitter, whereby a user of either vehicle may enter options relating to parking time, charging level, and available monetary funds, the electronics causing the transmitter to broadcast status information relating to a particular vehicle to the remote radio receiver associated with that vehicle.

7. The combined parking meter/charging station of claim 2 further comprising means to terminate power delivered to a vehicle in the event that the user is not authorized to operate the station.

\* \* \* \* \*